US010399009B2

(12) United States Patent
Suutari

(10) Patent No.: US 10,399,009 B2
(45) Date of Patent: Sep. 3, 2019

(54) FILLING SHOE, A FILLING SHOE ARRANGEMENT HAVING SUCH A FILLING SHOE, A FILTER MEDIUM ASSEMBLY HAVING SUCH FILLING SHOE ARRANGEMENTS, AND A METHOD FOR PROVIDING A FILTER MEDIUM WITH SUCH A FILLING SHOE

(71) Applicant: OUTOTEC (FINLAND) OY, Espoo (FI)

(72) Inventor: Teppo Suutari, Heituinlahti (FI)

(73) Assignee: OUTOTEC (FINLAND) OY, Espoo (FI)

( * ) Notice: Subject to any disclaimer, the term of this patent is extended or adjusted under 35 U.S.C. 154(b) by 44 days.

(21) Appl. No.: 16/180,121

(22) Filed: Nov. 5, 2018

(65) Prior Publication Data

US 2019/0070529 A1 Mar. 7, 2019

Related U.S. Application Data

(63) Continuation of application No. PCT/FI2016/050316, filed on May 12, 2016.

(51) Int. Cl.
*B01D 25/00* (2006.01)
*B01D 25/164* (2006.01)
(Continued)

(52) U.S. Cl.
CPC .......... *B01D 25/302* (2013.01); *B01D 25/16* (2013.01); *B01D 25/164* (2013.01);
(Continued)

(58) Field of Classification Search
CPC .. B01D 25/16; B01D 25/164; B01D 25/1645; B01D 25/176; B01D 25/21; B01D 25/215; B01D 25/30; B01D 25/302; B01D 29/56
See application file for complete search history.

(56) References Cited

U.S. PATENT DOCUMENTS

| 6,852,220 B1 * | 2/2005 | Grafen | B01D 25/30 210/229 |
| 2013/0043175 A1 | 2/2013 | Hara et al. | |
| 2015/0265947 A1 * | 9/2015 | Bohnke | B01D 25/215 210/770 |

FOREIGN PATENT DOCUMENTS

| JP | S5230976 A | 3/1977 | |
| JP | H1076110 A | 3/1998 | |
| WO | WO-2014056542 A1 * | 4/2014 | B01D 25/215 |

OTHER PUBLICATIONS

Written Opinion of the International Searching Authority issued by the European Patent Office acting as the International Searching Authority in relation to International Application No. PCT/FI2016/050316 dated Feb. 1, 2017 (5 pages).

(Continued)

*Primary Examiner* — Benjamin L Lebron
(74) *Attorney, Agent, or Firm* — Robert P. Michal, Esq.; Carter, DeLuca & Farrell LLP

(57) ABSTRACT

A filling shoe including a circular slurry opening extending between a filter plate side and a filter chamber side. A flange surrounds the slurry opening, and has an annular groove surrounding it and being arranged for receiving a filter medium. An outer edge of the body has a bevel towards the filter plate side on at least a part of the filling shoe. An outer edge of the flange is also provided with a bevel. Particularly, the filling shoe is formed as a single uniform piece of elastomer. A pin hole is provided so as to extend through the flange a position corresponding to the annular groove. A filling shoe arrangement, a filter medium assembly and a method for providing a filter medium with a filling shoe are also disclosed.

20 Claims, 10 Drawing Sheets

(51) Int. Cl.
*B01D 25/176* (2006.01)
*B01D 25/21* (2006.01)
*B01D 25/30* (2006.01)
*B01D 29/56* (2006.01)

(52) U.S. Cl.
CPC ....... *B01D 25/1645* (2013.01); *B01D 25/176* (2013.01); *B01D 25/21* (2013.01); *B01D 25/30* (2013.01); *B01D 29/56* (2013.01); *B01D 25/215* (2013.01)

(56) References Cited

OTHER PUBLICATIONS

International Search Report issued by the European Patent Office acting as the International Searching Authority in relation to International Application No. PCT/FI2016/050316 dated Feb. 1, 2017 (3 pages).

\* cited by examiner

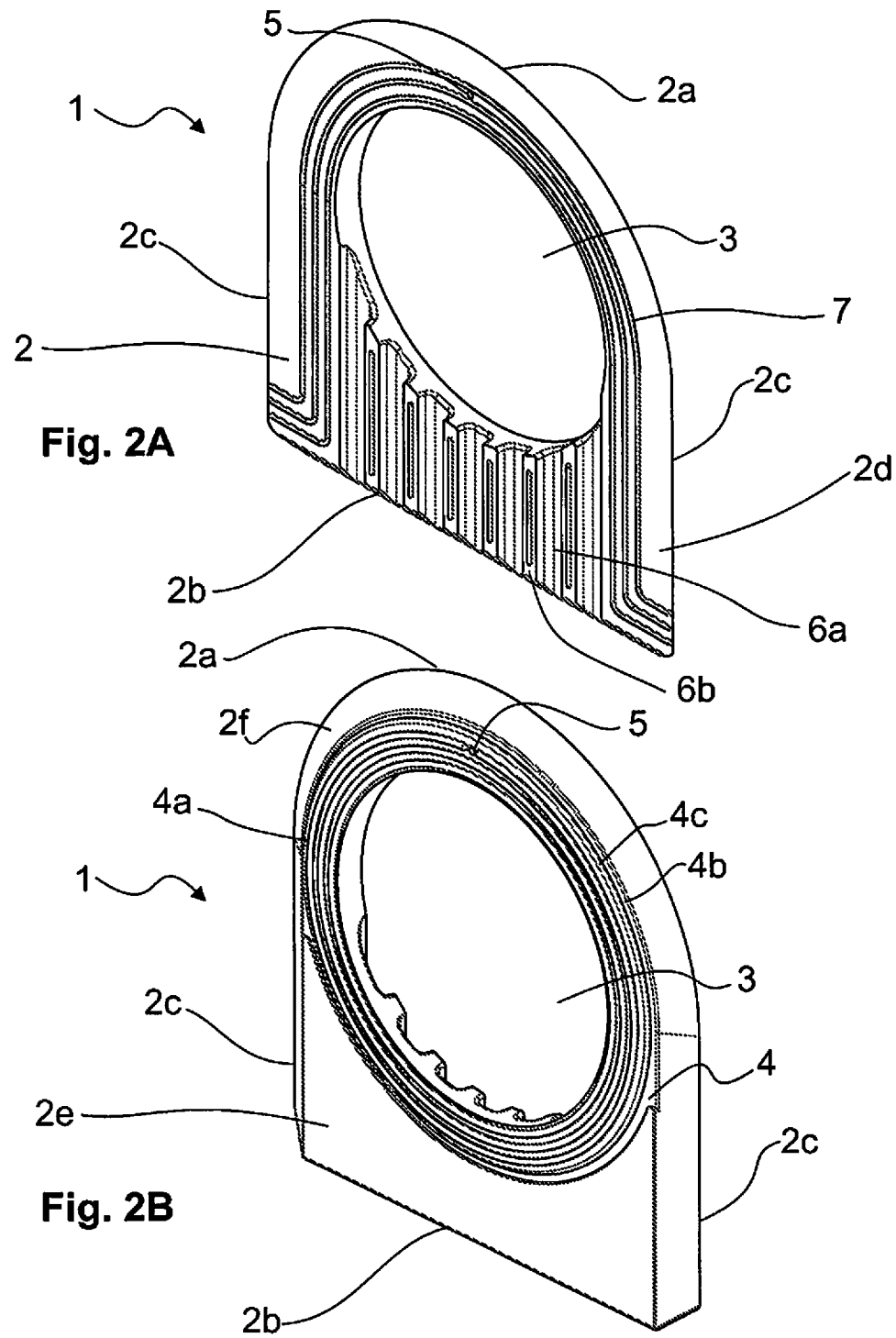

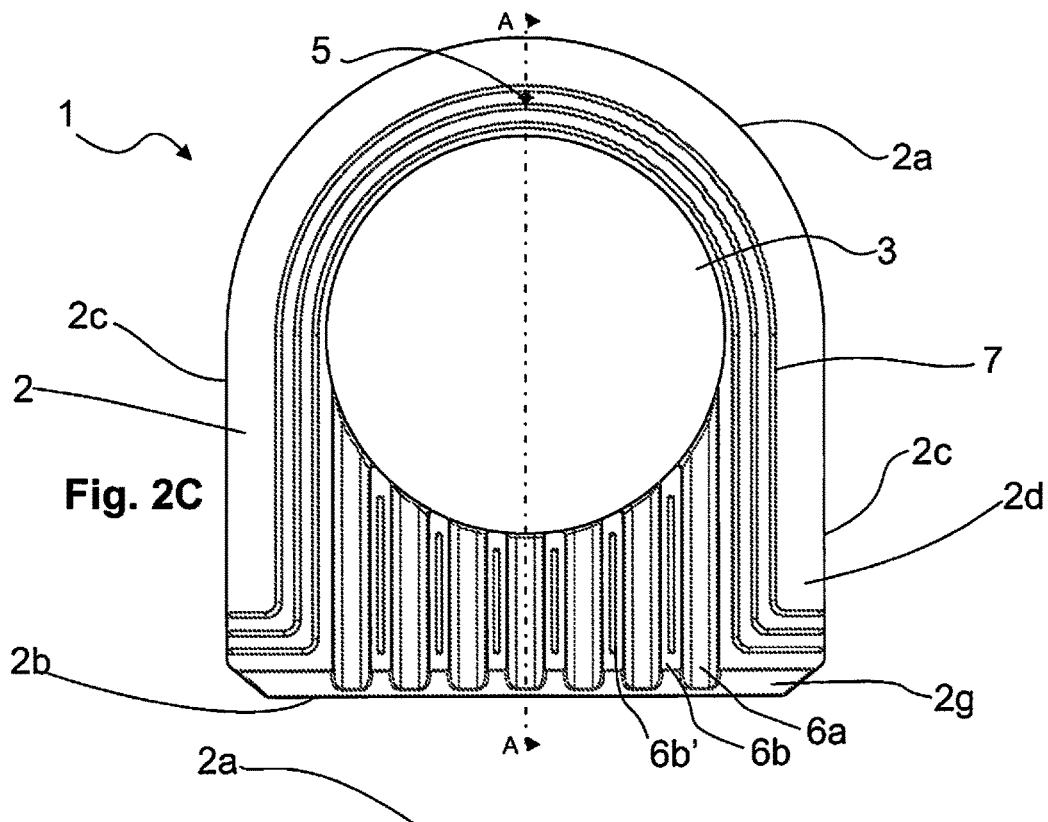
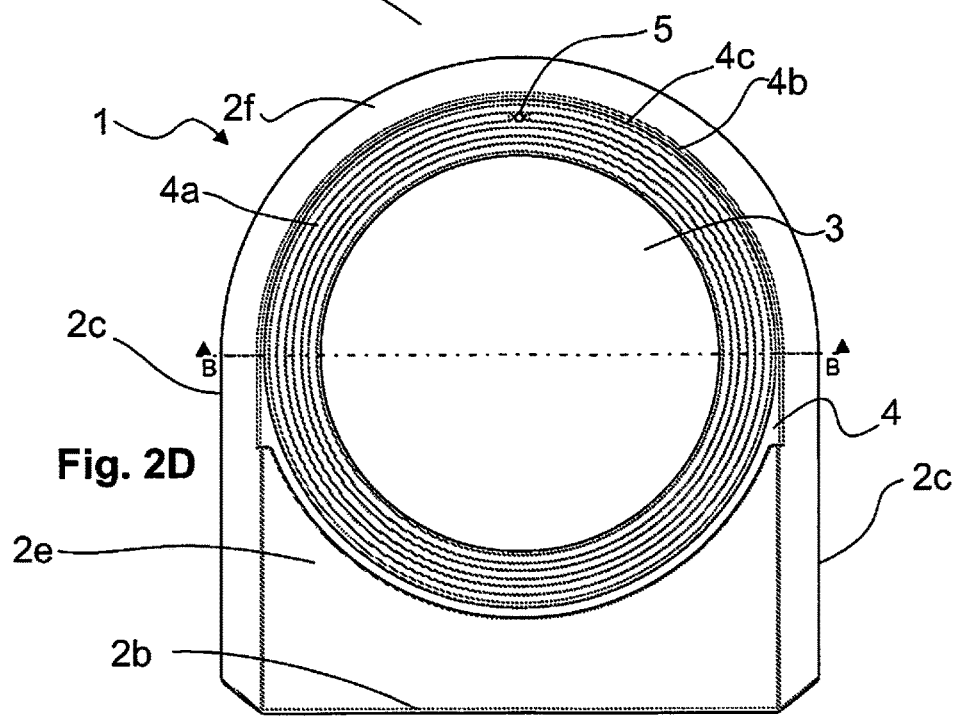

FILLING SHOE, A FILLING SHOE ARRANGEMENT HAVING SUCH A FILLING SHOE, A FILTER MEDIUM ASSEMBLY HAVING SUCH FILLING SHOE ARRANGEMENTS, AND A METHOD FOR PROVIDING A FILTER MEDIUM WITH SUCH A FILLING SHOE

CROSS-REFERENCE TO RELATED APPLICATIONS

This application is a continuation of PCT International Application No. PCT/FI2016/050316 filed May 12, 2016, the disclosure of this application is expressly incorporated herein by reference in its entirety.

FIELD OF THE DISCLOSURE

The present disclosure relates to horizontal filter presses and more particularly to filling shoes attachable to the filter media of such presses. The present disclosure also concerns a filling shoe arrangement, in which a filling shoe is attached to a filter medium, and a filter medium assembly, in which two such filling shoe arrangements are provided for forming a filter chamber. The present disclosure also concerns a method for providing a filter medium with a filling shoe.

BACKGROUND OF THE DISCLOSURE

In horizontal filter presses, a filter chamber is formed between two sheet-like filter media horizontally pressed between adjacent vertical filter plates. Hence, the name horizontal filter press. Each filter medium is equipped with a filling shoe enabling slurry to be fed from a slurry duct into the filter chamber via slurry passages. Particularly, the slurry duct may be formed by aligned openings provided on the succession of filter plates, filling shoes and filter media. The slurry passage, in turn, may be formed by the opposing filling shoes of the two filter media by a form extending from the opening of the duct towards the chamber.

Thus, the purpose of the filling shoe is to provide a route for feeding slurry in between two filter media, and to form a part of a common slurry duct.

A conventional filling shoe comprises a body having a slurry opening. From the opening, the filling shoe may comprise a form such as a groove extending towards the filter chamber. The conventional filling shoe also comprises an annular flange surrounding the slurry opening, wherein an annular groove is formed on the flange, extending radially with respect to the slurry opening such that the annular groove resides between the flange and the rest of the body. The conventional filling shoe is attached to a filter medium by inserting the flange through a corresponding opening in the filter medium, such that the filter medium is placed in the annular groove between the flange and the rest of the body. Moreover, conventional filling shoes have been equipped with a stud extending from the body into a corresponding recess in the flange within the annular groove for securing the rotational position of the filling shoe with respect to the filter medium. The stud has been arranged to extend through an opening in the filter medium dedicated for rotationally orienting the filling shoe to the filter medium.

The construction of the conventional filling shoe, particularly the stud, has mandated the filling shoe to be formed in a two-piece form. In practise, the flange part and the rest of the body have been formed separately, and subsequently adhered to each other to form the filing shoe. This, in turn, has led to unsatisfactory durability of the filling shoe. Notably, the joint between the flange part and the rest of the body has proven to break apart over time under the forces exerted on filling shoe by the filter press.

BRIEF DESCRIPTION OF THE DISCLOSURE

An object of the present disclosure is to provide a filling shoe, a filling shoe arrangement having such a filling shoe and a filter medium assembly having such filling shoe arrangements, so as to provide improved durability and robustness of the filling shoe. It is a further object of the disclosure to present a method for providing a filter medium with such a filling shoe.

The objects of the disclosure are achieved by what is stated in the independent claims. The preferred embodiments of the disclosure are disclosed in the dependent claims.

The disclosure is based on the idea of providing a filling shoe with a separate pin hole and utilizing a separate pin to rotationally secure the filling shoe to the filter medium. This enables the filing shoe to be formed as a single piece, which enhances the durability of the filling shoe in various ways, as described in further detail hereafter.

BRIEF DESCRIPTION OF THE DRAWINGS

In the following the disclosure will be described in greater detail by means of preferred embodiments with reference to the accompanying drawings, in which

FIG. 2A illustrates a perspective view of a filter chamber side of a filling shoe according to another embodiment of the disclosure;

FIG. 2B illustrates a perspective view of a filter plate side of a filling shoe according to another embodiment of the disclosure;

FIG. 2C illustrates a plan view of a filter chamber side of a filling shoe according to another embodiment of the disclosure;

FIG. 2D illustrates a plan view of a filter plate side of a filling shoe according to another embodiment of the disclosure;

DETAILED DESCRIPTION OF THE DISCLOSURE

Figure 1A:
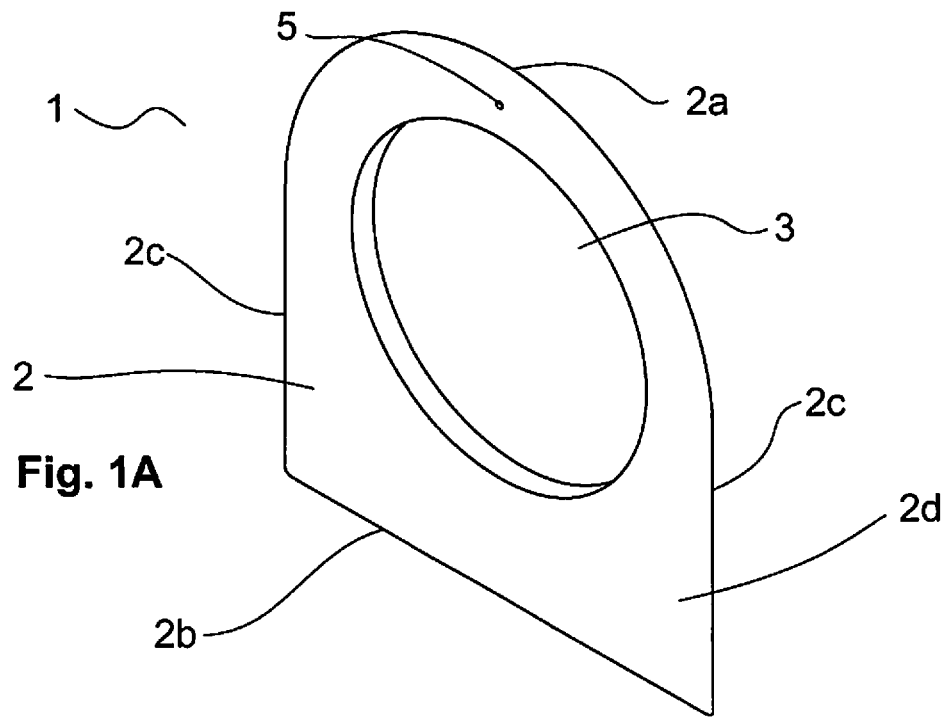
FIG. 1A illustrates a perspective view of a filter chamber side of a filling shoe according to an embodiment of the disclosure.

FIG. 1A through 1F illustrates different views of a fillings shoe 1 according to an embodiment of the disclosure. The filling shoe 1 has a body 2 with a semi-circular end 2a and a straight end 2b. Two lateral sides 2c, parallel with each other, extend between the semi-circular end 2a and the straight end 2b. A circular slurry opening 3 extends between these two sides of the filling shoe 1. On the semi-circular end 2a, a pin hole 5 is provided extending through the filling shoe 1 body 2.

Particularly, FIG. 1A illustrates a view showing the filter chamber side 2d of the filling shoe 1. In the filling shoe 1 of FIG. 1A, the filter chamber side 2d is flat.

Figure 1B:
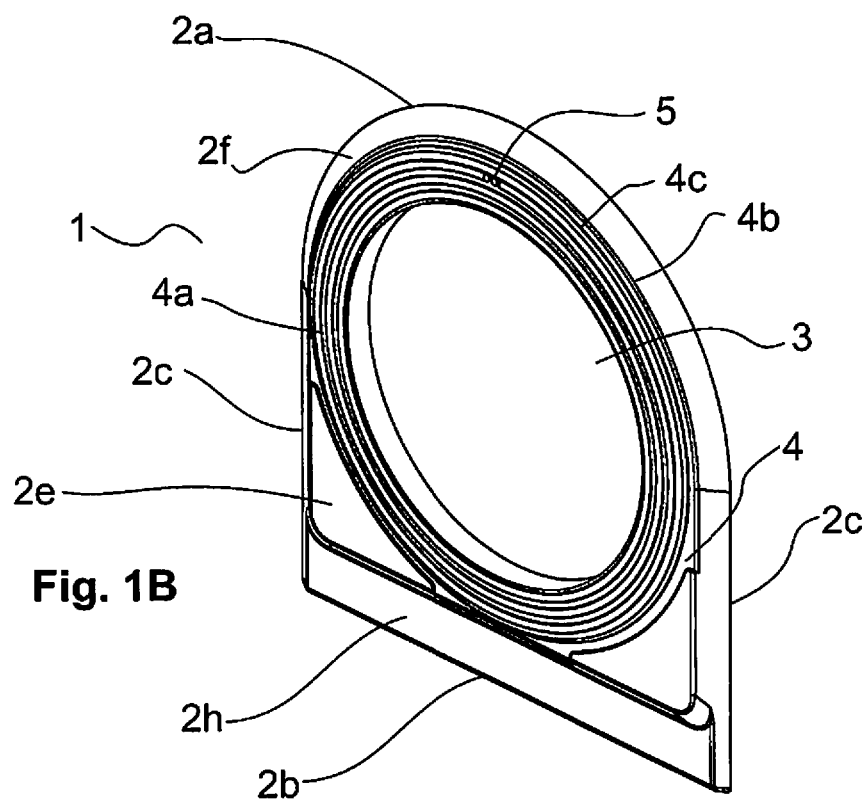
FIG. 1B illustrates a perspective view of a filter plate side of a filling shoe according to an embodiment of the disclosure.

FIG. 1B illustrates a view showing the filter plate side 2e of the filing shoe 1, from which a annular flange 4 surrounding the slurry opening 3 and following the circular shape thereof can be seen. The flange 4 has three annular sealing members 4a, which also are circular. The pin hole 5 is positioned in line with one of the annular sealing members 4a, so that the pin hole 5 locally interrupts the sealing member 4a, i.e. a gap is left between the pin hole 5 and the sealing member 4a, enabling a pin head 9a to be accommodated. FIG. 1B also shows that a bevel 2f is provided on the outer edge of the body 2, at the semi-circular end 2a and the lateral sides 2c. An area of reduced thickness 2h extending between the two lateral sides 2c is provided at the straight end 2b, on the filter plate side 2e. This area of reduced thickness could be alternatively be understood as a recessed portion on the filter plate side 2e of the filling shoe 1.

Figure 1C:
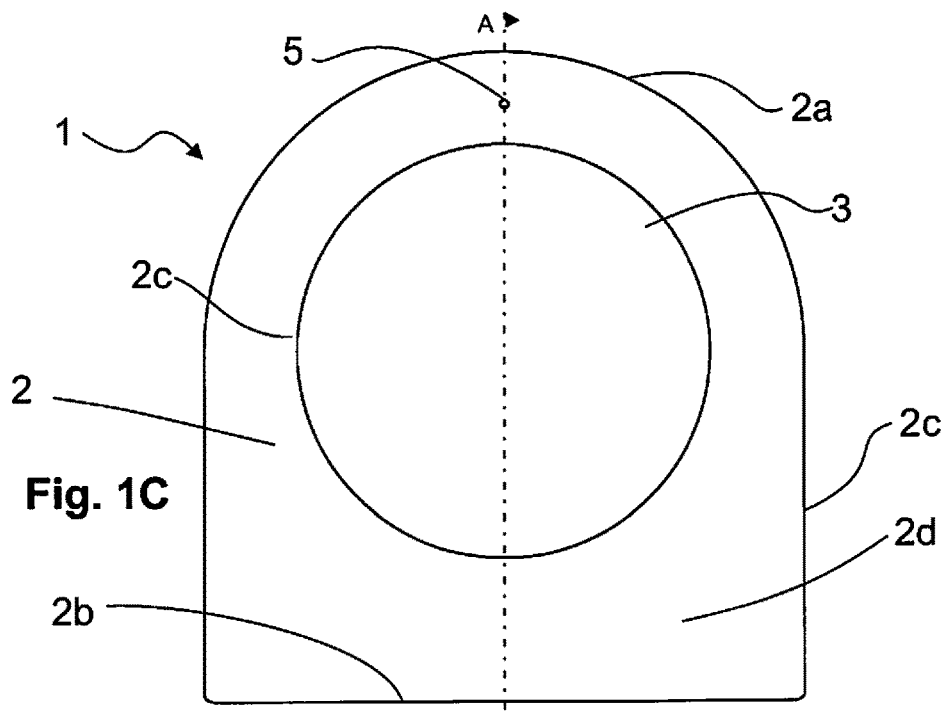
FIG. 1C illustrates a plan view of a filter chamber side of a filling shoe according to an embodiment of the disclosure.
Figure 1D:
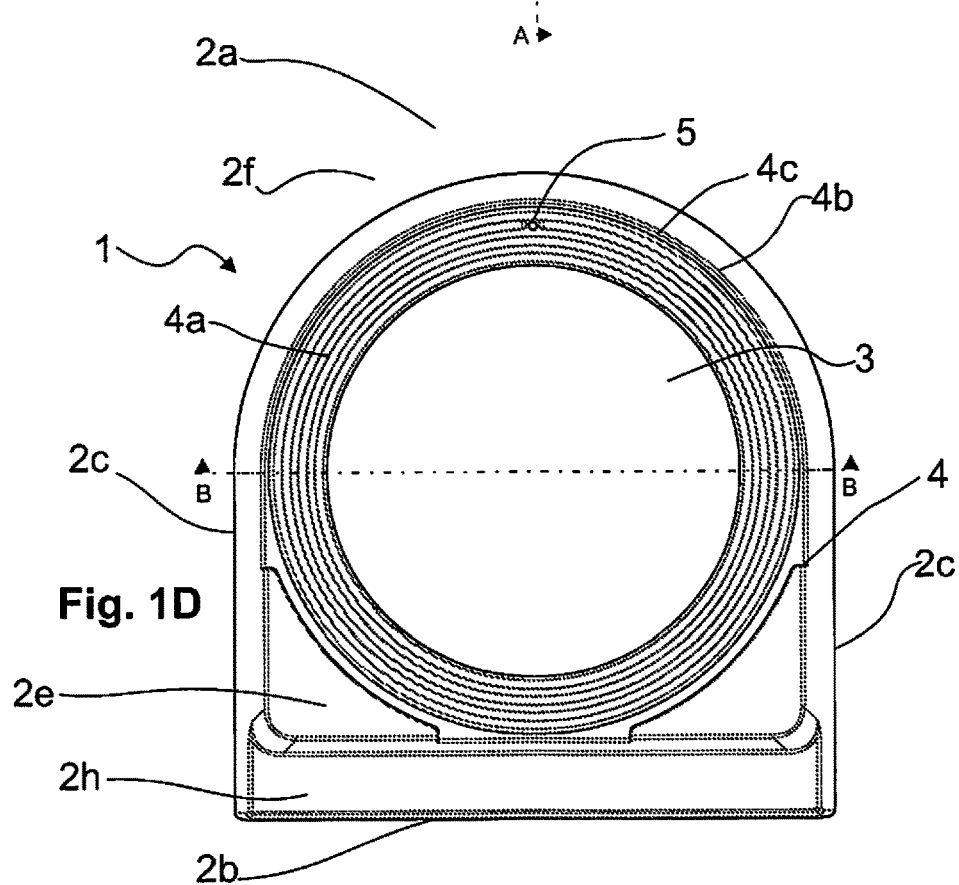
FIG. 1D illustrates a plan view of a filter plate side of a filling shoe according to an embodiment of the disclosure.

FIG. 1C shows a plan view of the filter chamber side 2d of the filling shoe 1, whereas FIG. 1D shows a plan view of the filter plate side 2e of the filing shoe 1. Notably, it can be seen, that the lateral sides 2c extend tangentially from the semi-circular end 2a. That is, the transition between the semi-circular end 2a and the lateral sides 2c is continuous. It can also be seen that the semi-circular end 2a, the flange 4 and the slurry hole 3 are all concentric.

Figure 1E:
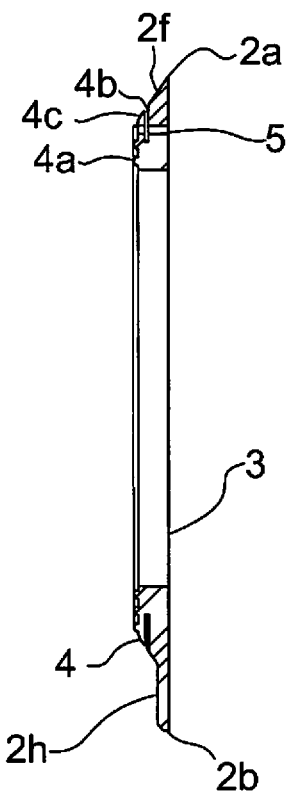
FIG. 1E illustrates a cut view along line A-A of FIG. 1C

From FIG. 1E it can be seen that an annular groove 4b, extending in a radial direction with respect to the slurry opening 3, is formed between the flange 4 and the rest of the filter plate side 2e of the body 2. Moreover, it can be seen that also an outer edge of the flange 4 is provided with a bevel 4c, and that this bevel 4c is substantially continuous with the bevel 2c on the outer edge of the body 2 at the semi-circular end 2a. It can also been seen, that the pin hole 5 is situated on the flange 4 at a position corresponding to the annular groove 4b.

Figure 1F:
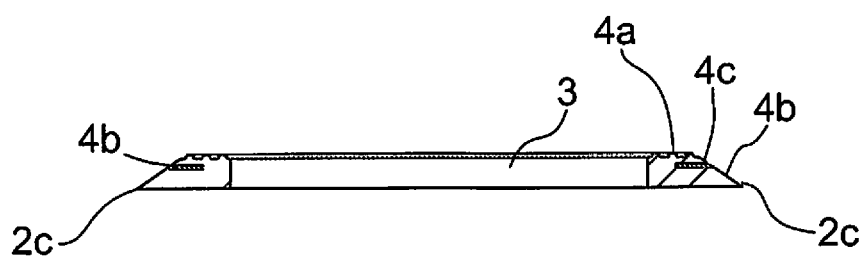
FIG. 1F illustrates a cut view along line B-B of FIG. 1C

From FIG. 1F, it can be seen that the bevel 4c on the outer edge of the flange 4 is also substantially continuous with the bevel 2c on the outer edge of the body 2 at the lateral sides 2c.

Moreover, it can be seen that also an outer edge of the flange 4 is provided with a bevel 4c, and that this bevel 4c is substantially continuous with the bevel 2c on the outer edge of the body 2 at the semi-circular end 2a and the lateral sides 2c.

FIG. 2A through 2F illustrates different views of a fillings shoe 1 according to an alternate embodiment of the disclosure. Particularly, the filling shoe of FIGS. 1A-1F is arranged to cooperate with the filling shoe of FIGS. 2A-2F as opposing filling shoes 1 of a filter chamber so as to form together a slurry passage between the slurry opening 3 and the filter chamber.

FIGS. 2A and 2B show perspective views of the filter chamber side 2d, and the filter plate side 2e, respectively. As can be seen, the filter chamber side 2d is not flat, but is equipped with multiple longitudinal grooves 6a extending from the slurry opening 3 towards the straight end 2b. These longitudinal grooves 6a are separated from each other with respective longitudinal ridges 6b provided with longitudinal sealing ribs 6b'. Further sealing ribs 7 following outer shape of the shape filling shoe 1 are provided on the filter chamber side 2d so as to seal the semi-circular end 2a and lateral sides 2c from the slurry opening 3, thus leaving a flow route only towards the straight end 2b via the longitudinal grooves 6a. It can also been seen that the straight end 2b is provide with a bevel 2g on the filter chamber side 2d, i.e. inwardly towards the filter chamber side 2a.

Particularly from FIG. 2D it can be noted that, as opposed to the filling shoe of FIGS. 1A-1F, the filter plate side 2a is not equipped with an area of decreased thickness, but is flat between the lateral sides 2c at the straight end 2b.

Figure 2E:
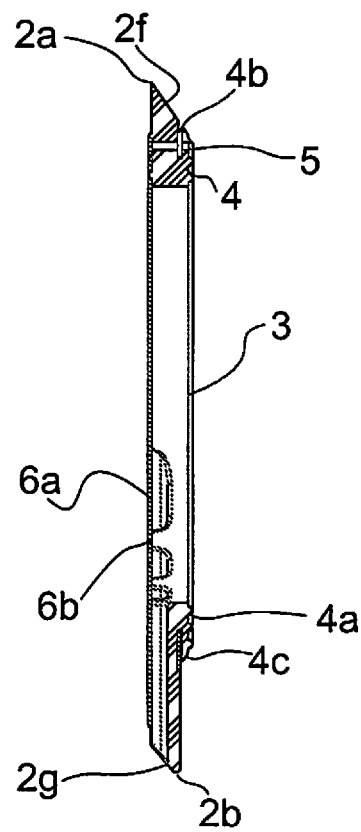
FIG. 2E illustrates a cut view along line A-A of FIG. 1C
Figure 2F:
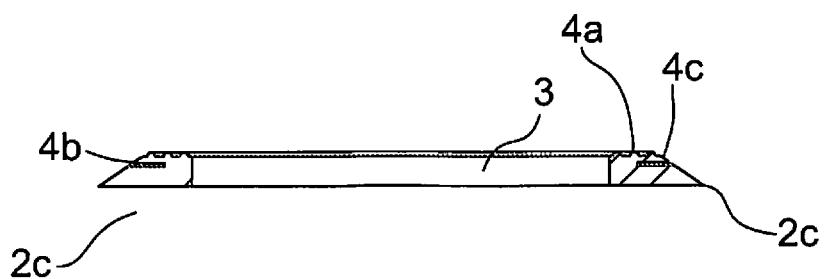
FIG. 2F illustrates a cut view along line B-B of FIG. 1C

From FIG. 2E the bevel 2g can be more clearly seen, whereas FIG. 2F illustrates more clearly the alternating longitudinal grooves 6a and ridges 6b extending from the slurry opening 3.

Figure 3A:
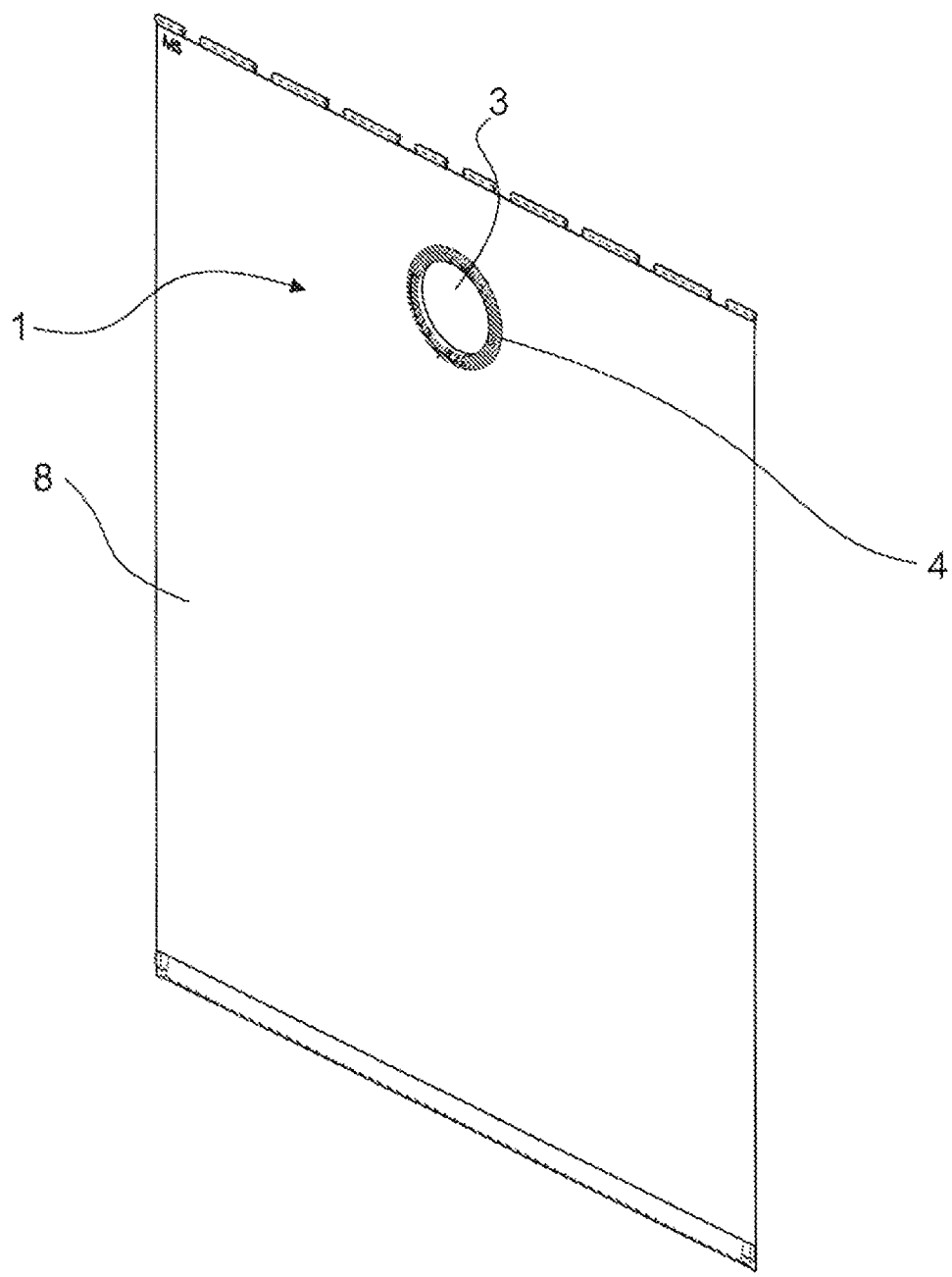
FIG. 3A illustrates a perspective view of a filling shoe arrangement having a filter medium attached to the filling shoe as seen from the filter plate side.
Figure 3B:
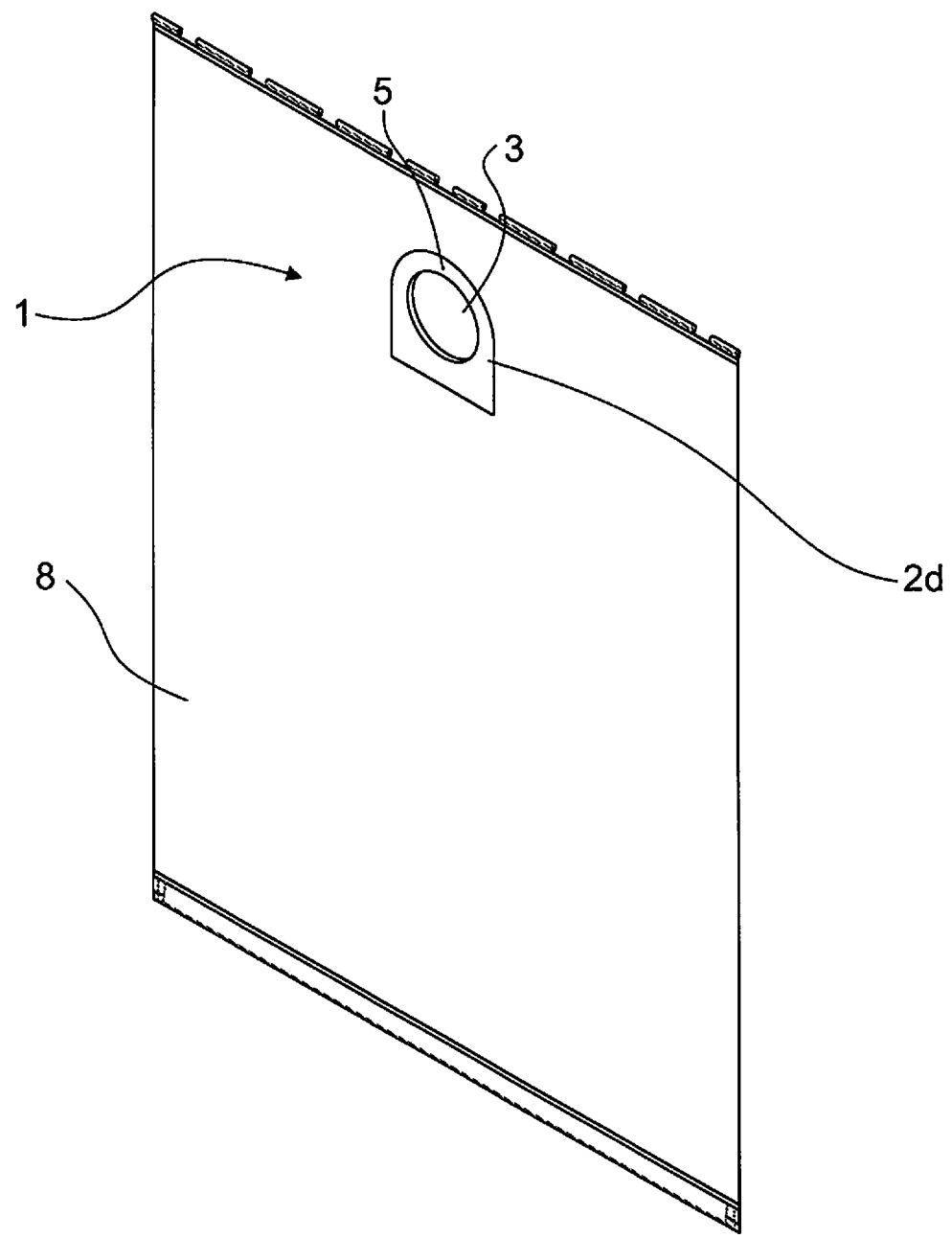
FIG. 3B illustrates a perspective view of the filling shoe arrangement of FIG. 3A as seen from the filter chamber side.

FIG. 3A illustrates a perspective view of a filling shoe arrangement having a filter medium 8 attached to the filling shoe as seen from the filter plate side. As the filling shoe 1 is attached to the filter medium 8 by inserting the flange 4 through an opening in the filter medium 8, such that the filter medium 8 resides within the annular groove 4b, only the flange 4 extends from the plane of the filter medium 8. FIG. 3B, in turn illustrates a perspective view of the filling shoe arrangement of FIG. 3A as seen from the filter chamber side 2d.

Figure 4:
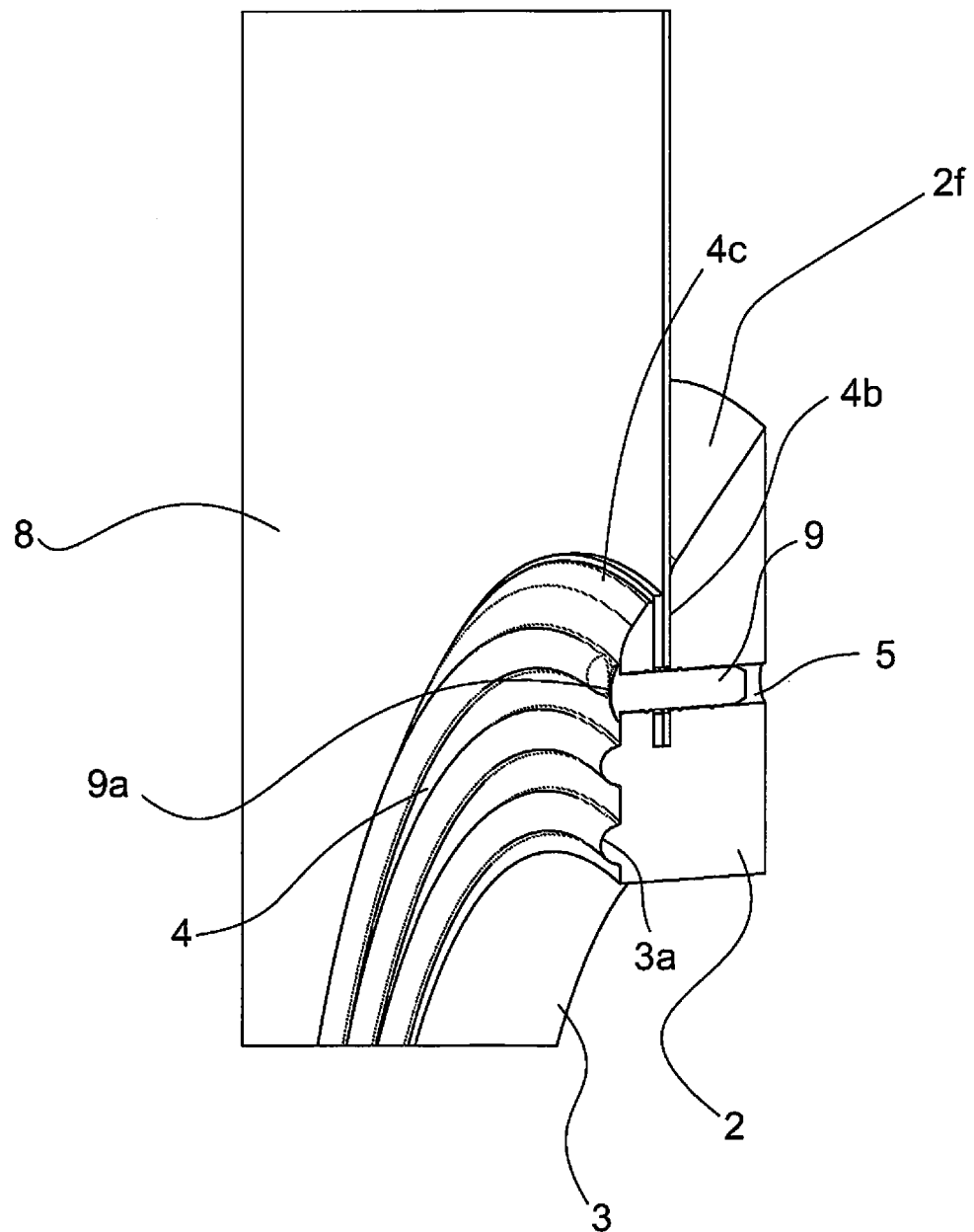
FIG. 4 illustrates a perspective partial cut view of a filling shoe arrangement according to an embodiment of the disclosure

FIG. 4 illustrates a more detailed view of the filing shoe arrangement, particularly on how the filling shoe is attached to the filter medium 8. The filter medium 8 resides within the annular groove 4b, between the flange 4 and the rest of the filling shoe 1. A pin 9 is inserted into the pin hole 5, through the flange 4 and the filter medium 8, extending into the rest of the filling shoe 1 body 2. A pin head 9a of the pin 9 abuts the flange 4.

Figure 5:
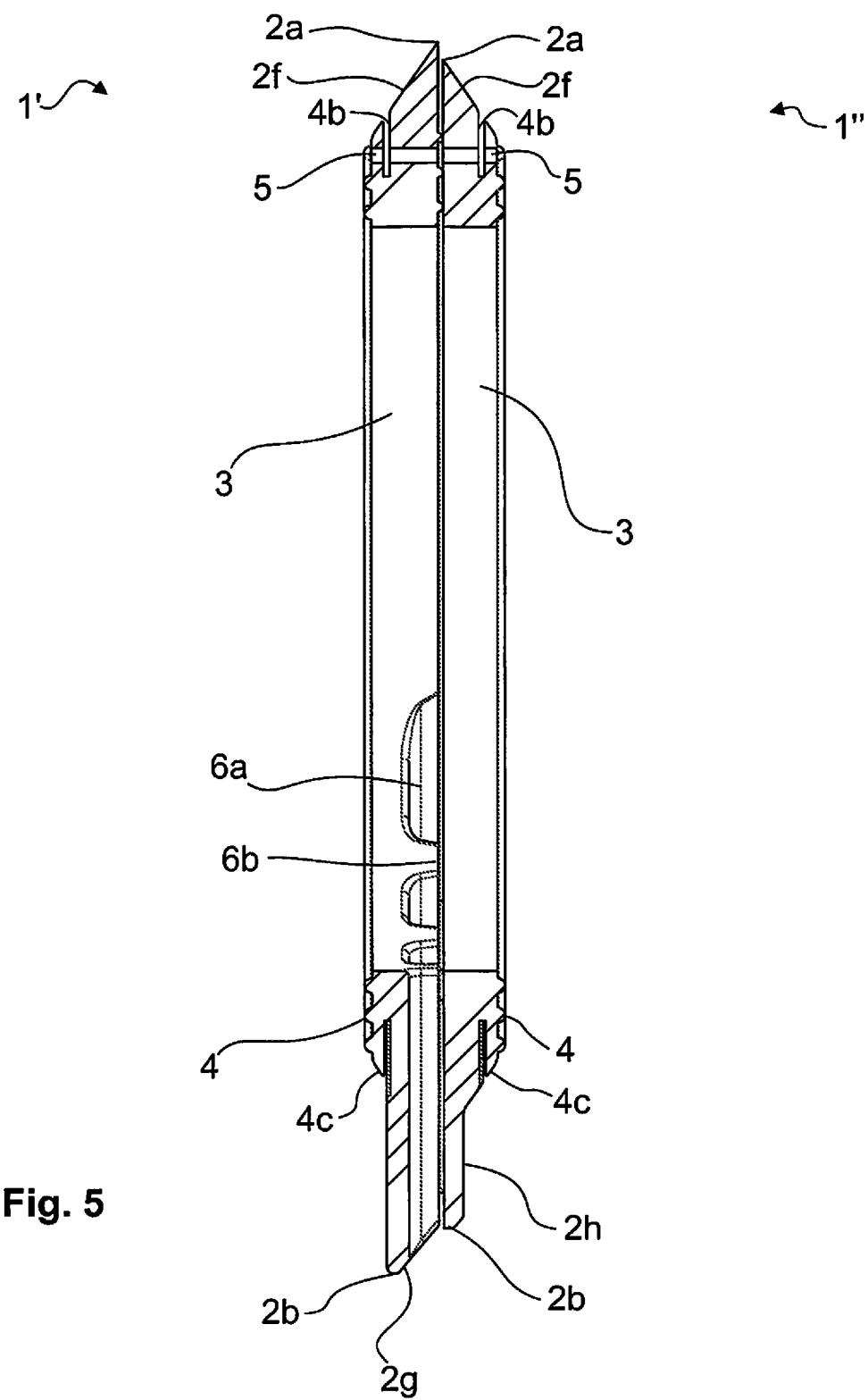
FIG. 5 illustrates a cut view of two opposing filling hose of a filter chamber positioned against each other

FIG. 5 illustrates how the filling shoes 1 of FIGS. 1A-1F and 2A-2F, i.e. a first filling shoe 1', and a second filling shoe 1", respectively, cooperate together as opposing filling shoes of a filter chamber. Particularly, FIG. 5 schematically illustrates a situation in which the filling shoes 1', 1" are pressed together when the filter chamber is closed. For the purpose of clarity, filter plates and filter media are not shown in FIG. 5. As can be seen, the filter chamber sides 2d are facing each other in an aligned manner and the slurry openings 3 and the pin holes 5 are aligned with each other, respectively. Moreover, the longitudinal ridges 6b separating the longitudinal grooves 6a of the first filling shoe 1' are pressed against the flat surface on the filter chamber side 2d of the second filling shoe 1", thus forming a slurry passage out of the slurry opening 3. When aligned, the straight end 2b of the opposing filling shoe 1" is positioned at the level where the bevel 2g on filter chamber side 2e at the straight edge 2b of the first filling shoe 1' begins.

According to a first aspect of the disclosure, a filling shoe 1 attachable to a filter medium 8 of a horizontal filter press is provided. In the context of this disclosure, a horizontal filter press is of the type having vertical filter plates and filter media, forming filter chambers therebetween when pressed in the horizontal direction.

The filling shoe comprises a body 2 having a semi-circular end 2a, a straight end 2b and two lateral sides 2c extending between the semi-circular end 2a and the straight end 2b. The body further defines a filter plate side 2e and a filter chamber side 2d. A circular slurry opening 3 extends between the filter plate side 2e and said filter chamber side 2d. The shapes of the semi-circular end 2a and the circular slurry opening 3 have been chosen in order to achieve continuous forms, which increase the durability of the filling shoe 1 due to the elimination of discontinuities at the pressurized portions. The lateral sides 2c and a straight end 2b are also provided as a means for rotationally aligning the filling shoe 1 with a filter plate, which also increases the durability of the filling shoe 1 as this, on its part, ensures that the filling shoe is nested within a recess on the filter plate when the filling shoe is compressed between filter plates.

Suitably, the curvature of the semi-circular end 2a starts at the level of the center of the slurry hole such that the lateral sides 2c continue tangentially from the semi-circular end 2a. This ensures, that the shape of the transition between the semi-circular end 2a and the lateral sides 2c is continuous, which improves durability as discussed above. Suitably, the semi-circular end 2a is concentric with the slurry opening 3, which ensures a uniform material strength on around the semi-circular end 2a. Uniform material strength, in turn, ensures that no internal strain peaks are formed within the filling shoe 1 due to the pressurization of the slurry opening 3 or compression of the filling shoe 1 between filter plates.

On the filter plate side 2d, a flange 4 surrounds the slurry opening 3, wherein the flange 4 is elevated from the rest of the filter plate side 2e of the body 2. The flange has at least one annular sealing member 4a protruding axially with respect to the slurry opening 3. The annular sealing member 4a is suitably formed as a rib form. Moreover, the annular sealing member 4a ensures that a sufficient sealing effect is achieved between the flange 4 and the respective recess in the filter plate with a smaller pressure used to press the filter plates against each other. This is because the annular sealing member 4a has a smaller surface area against the filter plate, and thus a bigger surface pressure than the rest of the filling shoe 1. Moreover, the sealing member 4a is structurally less rigid than the whole of the flange 4, and thus more prone deform under pressure to provide a sealing effect. Again, the filter plates need to be pressed against each other at a smaller force in order to achieve the desired sealing effect. This, in turn, results in improved overall durability of the filling shoe 1 as less force is needed to exert on it when compressed between filter plates.

An annular groove 4b surrounds the flange 4 and extends radially towards the slurry opening 3. The groove 4b is arranged for receiving a filter medium 8 such that the filter medium 8 is situated between the flange 4 and the rest of the body 2. This ensures, that at least the translational position of filling shoe 1 is secured with respect to the filter medium 8.

An outer edge of the body 2 has a bevel 2f inwardly towards the filter plate side 2e on at least the semi-circular end 2a and the two lateral sides 2c. This bevel 2f serve multiple functions. Firstly, it helps to position the filling shoe 1 with respect to the filter plate when adjacent filter plates are being pressed by concentrating the bevel 2f with a corresponding bevel on a recess of the filter plate. As the filling shoe 1 is correctly positioned, it becomes nested in a corresponding recess of the filter plate, if the filling shoe is not correctly positioned with respect to the filter plate, it becomes squeeze between non-recessed parts of the filter plates, which leads to breakage of the filling shoe 1. A second purpose of the bevel 2f is to smoothen out the tension exerted on the filling shoe 1 by the filter medium 8. If the outer edge would not have a bevel 2f, but a straight corner, the filter medium 8 would exert a tension peak on the corner when the filter chamber is pressed closed and the slurry pushes the filter medium 8 against the filter plates.

An outer edge of the flange 4 is also provided with a bevel 4c. The flange is dimensioned such that said bevel 2f inwardly towards the filter plate side 2e on the outer edge of the body 2, on at least the semi-circular end 2a and the two lateral sides 2c, and the bevel 4c on the outer edge of the flange 4 form a substantially continuous bevel on at least on the semi-circular end 2a. That is, the bevel 4c on the flange 4 is parallel with, and coincides with a continuation of the bevel 2f on the outer edge of the body 2, on at least the semi-circular end and the lateral sides 4c.

This bevel 2f also helps to position the filling shoe 1 with respect to the filter plate when adjacent filter plates are being pressed by concentrating the bevel 4c with a corresponding bevel on a recess of the filter plate. As the filling shoe 1 is correctly positioned, it becomes nested in a corresponding recess of the filter plate, and if the filling shoe 1 is not correctly positioned with respect to the filter plate, it becomes squeeze between non-recessed parts of the filter plates, which leads to breakage of the filling shoe 1.

The filling shoe 2 is formed as a single uniform piece of elastomer. That is, it is not formed by attaching two or more pieces together. As there is no joint between two separate portions, a homogenous material structure is achieve for the filling shoe 1. Furthermore, as the material structure does not have discontinuities, a stronger and more durable filling shoe 1 is achieved. The elastomer material enables particularly the flange 4 to be flexed so as to insert it through an opening in the filter medium 8 and position the filter medium 8 in the annular groove 4b.

A pin hole 5 is provided so as to extend through the flange 4 and at least up to the rest of the body 2. The pin hole 5 is located on the flange 4 at a position corresponding to the annular groove 4b. In other words, on the flange 4, the pin hole 5 extends to the annular groove 4b. The pin hole 5 enables the filling shoe 1 to be formed as a single piece because as a stud within the annular groove is no longer required for securing the rotational position of the filling shoe with respect to the filter medium 8, as a separate pin 9 can be used.

Preferably, but not necessarily, the bevel 2f inwardly towards the filter plate side 2e on at least the semi-circular end 2a and the two lateral sides 2c, and the bevel 4c on the outer edge of the flange 4 are inclined at an angle between 30°-40° with respect to the plane of the filter plate side 2e of the body 2, i.e. radial direction of the slurry opening 3. A smaller angle provides decreased tension exerted on the filling shoe 1 by the filter medium 8, and hence improves the durability of the filling shoe 1. On the other hand a larger angle enables the filling shoe to better fill the recess in the filer plate, in which is nested, when the filling shoe 1 is compressed between the opposing filter plates of the filter chamber. As a result, less solid deposit is formed into the recess of the filter plate, which also results in improved durability of the filling shoe 1, as the solid deposits are abrasive and wear both the filling shoe and the filter plates. Hence, the angle at an angle between 30°-40° has been found to provide improved durability via both ways.

Preferably, but not necessarily, the slurry hole 3 has a minimum diameter of 150 mm. This also contributes to improved durability of the filling shoe 1 as such a diameter has proven to provide a sufficiently slow flow rate that the abrasive properties of the slurry does not rise to a significant factor.

Preferably, but not necessarily, the flange 4 has an annular width of between 30 mm-40 mm. In this context the term annular width is used to mean the distance from the inside of the flange to the outside of the flange, i.e the difference of the internal and external radii of the flange 4. It should also be noted, that the internal radius of the flange 4 corresponds to the radius of the slurry opening 3. It has been discovered, that such an annular width provides a sufficient material strength for the flange 4 to withstand being compressed into a recess in the filter plate repeatedly while maintaining the size of the flange 4 relatively small. As a result, a more durable filling shoe 1 is achieved.

Preferably, but not necessarily, the depth of the annular groove 4*b* is between 30%-55% of the annular width of the flange 4. This provides a sufficient space for the groove 4*b* to securely attach the filling shoe 1 to the filter medium 8, while maintaining a sufficient material strength for the rest of the flange 4 in order to withstand being compressed into a recess in the filter plate repeatedly. As a result, a more durable filling shoe 1 is achieved.

Preferably, but not necessarily, the distance between the slurry opening 3 and the straight end 2*b* is at least 60 mm. This has proven to provide a sufficient material strength to withstand both being compressed into a recess in the filter plate repeatedly in addition to torsional force exerted on the filling shoe 1 as a result of being rotationally aligned with the filter plate when being compressed. As a result, a more durable filling shoe 1 is achieved Preferably, but not necessarily, the filling shoe 1 is formed by injection moulding. Injection moulding provides a uniform continuous material structure, which in turn result in increased strength and consequently durability, as there are no discontinuities in the material structure. Any suitable elastomer may used for moulding the filling shoe 1. Examples of such elastomers are EPDM, NBR, SBR, NR, PUR, TPV.

Preferably, but not necessarily, the pin hole 5 extends through the body 2 of the filling shoe 1. Thus, the pin 9 is more securely hold in the pin hole 5. Consequently, the pin 9 will not undesirably come of under repetitive compression between filter plates. If the pin would come off during operation, it might become dislocated between the filling shoe 1 and the filter plate, which could result in a breakage of the filling shoe when compressed. Thus, improved durability of the filling shoe 1 is achieve by extending the pin hole 5 through the body 2 of the filling shoe 1.

Preferably, but not necessarily, the pin hole 5 is positioned on the semi-circular end 2*a* portion of the flange, on a centreline of the filling shoe. The centreline is considered to run through the centre of the slurry opening 3 and to be parallel with the lateral sides 2*c*. Such a construction ensures, that the pin hole 5 is on the centreline of the filling shoe 1, while the centre of gravity is located directly below the pin hole 5. This results in that, if the pin at least partially supports the weight of the filter medium 8, the weight of the filter medium 8 does not rotate the filling shoe 1 out of position. Thus, improved durability for the filling shoe 1 is achieved, as the risk for misalignment of the filing shoe 1 with respect to the filter plate is reduced. As has already been discussed, the filling shoe 1 being misaligned with the filter plate might result in the filling shoe 1 braking when compressed.

Preferably, but not necessarily, the at least one annular sealing member 4*a* has a section of decreased elevation arranged to accommodate a pin head 9*a* of a pin 9. Suitably, the section of decreased elevation is at the level of the rest of the flange 4, wherein the pinhole 5 is positioned within said section. This ensures that the pin hole 5 may positioned in line with an annular sealing member 4*a*, and a pin 9 inserted into the pin hole 5 such that the head 9*a* of the pin 9 does no protrude over the annular sealing members 4*a*. This will provide a sufficient restrained space for the pin head 9*a*, when the filling shoe 1 is compressed between filter plates. That is, the pin will not be crushed too far into the pin hole 5, which might break the filling shoe 1, nor can the pin 9 be pushed out of the pinhole 5 by the pressure in the filter chamber, which might also result in the filling shoe becoming broken, as discussed earlier above.

Preferably, but not necessarily, a plurality of annular sealing members 4*a* are provided on the flange 4. A plurality of annular sealing members 4 further enhances the benefits of a single annular sealing member, as discussed earlier. Namely, even less force is needed to use to press the filter plates against each other, and less force is exerted on the filling shoe 1. As a result, the filling shoe 1 will be able to better withstand repetitive compressions between filter plates, and consequently, the durability of the filling shoe 1 is improved. Suitably, the annular sealing members 4*a* are rib profiles formed on the flange 4.

Preferably, but not necessarily, at least one longitudinal groove 6*a* extending from the slurry opening 3 towards the straight end 2*b* is provided on the filter chamber side 2*d* for forming a slurry passage between the slurry opening 3 and a filter chamber.

Preferably, but not necessarily, multiple grooves 6*a* extending from the slurry opening 3 towards the straight end 2*b* are provided on the filter chamber side 2*d* for forming separate slurry passages between the slurry opening 3 and a filter chamber. Suitably, adjacent grooves 6*a* are separated by ridges 6*b*, each ridge 6*b* being advantageously provided with a longitudinal sealing rib 6*b*'. Providing multiple grooves 6*a* separated by ridges 6*b* improves the filling shoes 1 capability to resist deformation, when pressed, at the area of the slurry passage. As a result, the filling shoe 1 will be able to better withstand repetitive compressions between filter plates, and consequently, the durability of the filling shoe 1 is improved.

Preferably, but not necessarily, the outer edge of the body 2 has a bevel 2*g* inwardly towards the filter chamber side 2*d* at the straight end 2*b*. This bevel 2*g* is particularly beneficial when one of the filter plates of the filter chamber is equipped with a membrane for further pressing the filter chamber. The membrane will push the filter media 8 of its respective filter plate outwardly from said filter plate. The filter medium 8 pushed by the membrane exerts a notable force on the straight end 2*b* of the filling shoe 1 of the opposing filter plate. Such a locally exerted strain is alleviated by providing the straight end with the bevel 2*g*, which in turn results in improved durability of the filling shoe 1.

Preferably, but not necessarily, an area of reduced thickness 2*h* extending between the two lateral sides 2*c* is provided at the straight end 2*b*. This are of reduced thickness could be understood as a recessed portion, suitably on the filter plate side 2*e*, of the filling shoe 1.

This is particularly beneficial when one of the filter plates of the filter chamber is equipped with a membrane for further pressing the filter chamber. The membrane will push the filter media 8 of its respective filter plate outwardly from said filter plate, against the filter plate side 2*e* of the filling shoe 1. The filter medium 8 pushed by the membrane exerts a notable force on the straight end 2*b* of the filling shoe 1 of the filter plate. Such a locally exerted strain is alleviated by providing the area of reduced thickness 2*h*, as this enables the direction of the filter medium 8 and the membrane to change gradually, which in turn results in improved durability of the filling shoe 1.

According to a second aspect of the disclosure a filling shoe arrangement is provided. The filling shoe arrangement comprises at least one filling shoe 1 of the type discussed above.

The filling shoe arrangement further comprises a filter medium 8 for a horizontal filter press. The filter medium 8 comprises at least one first opening arranged to cooperate with the annular groove 4b of the filling shoe 1, and at least one second opening arranged to cooperate with the pin hole 5 of the filling shoe 1. The dimensioning and position of the first and second opening functionally correspond to those of the annular groove and the pin hole of the filling shoe, respectively. In this context the term functionally correspond is used to mean that the dimensions in question do not need to exactly match each other, but do not differ from each other to the extent that the seal between the filter medium and the filling shoe, or the positioning/alignment of the filling shoe 1 with respect to the filter medium is weakened. Particularly, the openings on the filter medium 8 may be slightly undersized in order to provide a tight fit, as the filter medium is able to slightly stretch.

Furthermore, a pin 9 is provided, having an outer dimension functionally corresponding to the inner dimension of the pin hole 5 and the second opening of the filter medium 8. The pin 9 is equipped with a pin head 9a having an outer dimension larger than the inner dimension of the pin hole 5.

The first opening of the filter medium 8 is positioned around the slurry opening 3, in the annular groove 4b of the filling shoe 1, between the flange 4 and the rest of the filter plate side 2e of the body 2, thereby attaching the filling shoe 1 to the filter medium 8.

The second opening of the filter medium 8 is in an aligned position with the pin hole 5.

The pin 9 is inserted into the pin hole 5 and through the second opening of the filter medium 8, such that the pin head 9a abuts the flange 4, thereby locking the rotational position of the filling shoe 1 with respect to the filter media 8.

According to a third aspect of the disclosure, a filter medium assembly is provided. The filter medium assembly comprises a first and second filling shoe arrangements as discussed above in connection with the second aspect of the disclosure.

The filter chamber sides 2d of the filling shoes of the first and second filling shoe arrangements are positioned so as to oppose each other in an aligned manner. Particularly, the position of the slurry opening 3 on the filling shoe 1 of the first filling shoe arrangement corresponds to that of the second filling shoe 1 arrangement. This enables a filter chamber to be formed between the filter media 8 of the first and second shoe arrangements by pressing the filter medium assemblies between adjacent filter plates.

Advantageously, also the position of the pin hole 5 on the filling shoe 1 of the first filling shoe arrangement corresponds to that of the second filling shoe arrangement.

Preferably, but not necessarily, the first filling shoe arrangement is equipped with a filling shoe 1' having at least one longitudinal groove 6a extending from the slurry opening 3 towards the straight end 2b is provided on the filter chamber side 2d for forming a slurry passage between the slurry opening 3 and a filter chamber. Advantageously, multiple grooves 6a are provided extending from the slurry opening 3 towards the straight end 2b are provided on the filter chamber side 2d for forming separate slurry passages between the slurry opening 3 and a filter chamber. Suitably, adjacent grooves 6a are separated by ridges 6b, each ridge 6b being advantageously provided with a longitudinal sealing rib 6b'.

The outer edge of the body 2 may also have a bevel 2g inwardly towards the filter chamber side 2d at the straight end 2b.

The second filling shoe arrangement is equipped with a filling shoe 1" having a flat surface on the filter chamber side 2d. Moreover, an area of reduced thickness 2h extending between the two lateral sides 2c may be provided at the straight end 2b. This area of reduced thickness could be understood as a recessed portion, suitably on the filter plate side 2e of the filling shoe 1".

This arrangement results in a slurry passage extending from the slurry opening 3, being formed between the first and second filling shoe arrangements, the slurry passage being defined by the at least one longitudinal groove 6 of second filling shoe 1 pressed against the flat surface on the filter chamber side 2d body 2 of the first filling shoe 1.

According to a fourth aspect of the disclosure, a method for providing a filter medium 8 with a filling shoe 1 in a horizontal filter press is provided.

The method comprises the following steps:
- providing a filling shoe 1 according to any of the embodiments of the first aspect of the disclosure.
- providing a filter medium 8 comprising at least one first opening corresponding to the annular groove 4b of the filling shoe 1, and at least one second opening corresponding to the pin hole 5 of the filling shoe 1, such that the dimensioning and position of the first and second opening functionally corresponds to those of the annular groove 4b and the pin hole 5 of the filling shoe 1, respectively;
- providing a pin;
- positioning the filter medium 8 around the first opening in the annular groove 4b of the filling shoe 1, between the flange 1 and the rest of the filter plate side 2e of the body 2;
- positioning the filling 1 shoe rotationally with respect to the filter medium 8 such that the second opening of the filter medium 8 is aligned with the pin hole 5, and
- inserting the pin 9 into the pin hole 5 and through the second opening of the filter medium 8, wherein the pin 9 is inserted from the filter plate side 2e of the filling shoe 1.

The invention claimed is:

1. A filling shoe attachable to a filter medium of a horizontal filter press, said filling shoe comprising:
   - a body having a semi-circular end, a straight end and two lateral sides extending between the semi-circular end and the straight end, the body further defining a filter plate side and a filter chamber side;
   - a slurry opening, wherein the slurry opening is circular, the slurry opening extending between said filter plate side and said filter chamber side;
   - on the filter plate side, a flange surrounding the slurry opening, wherein the flange is elevated from the rest of the filter plate side of the body, the flange having at least one annular sealing member protruding axially with respect to the slurry opening;
   - an annular groove situated betweem the flange and the rest of the body and extending radially towards the slurry opening, said annular groove being arranged for receiving a filter medium, wherein
   - an outer edge of the body having a bevel towards the filter plate side on at least the semi-circular end and the two lateral sides, and wherein an outer edge of the flange is also provided with a bevel, the flange being further dimensioned such that the bevel towards the filter plate side on the outer edge of the body at least at the semi-circular end and the two lateral sides and the bevel on the outer edge of the flange form a substantially continuous bevel on at least on the semi-circular end, characterized in that the filling shoe is formed as a single uniform piece of elastomer, and in that a pin hole being provided so as to extend through the flange and at least up to the rest of the body, the pin hole being located on the flange at a position corresponding to the annular groove.

2. The filling shoe according to claim 1, wherein the bevel towards the filter plate side on at least the semi-circular end and the two lateral sides, and the bevel on the outer edge of the flange are inclined at an angle between 30° -40° with respect to the plane of the filter plate side of the body.

3. The filling shoe according to claim 1, wherein the slurry opening has a minimum diameter of 150 mm.

4. The filling shoe according to claim 1, wherein the flange has an annular width between 30 mm-40 mm.

5. The filling shoe according to claim 1, wherein the depth of the annular groove is between 30%-55% of the annular width of the flange.

6. The filling shoe according to claim 1, the distance between the slurry opening and the straight end is at least 60 mm.

7. The filling shoe according to claim 1, wherein the filling shoe is formed by injection moulding.

8. The filling shoe according to claim 1, wherein the pin hole extends through the body of the filling shoe.

9. The filling shoe according to claim 1, wherein the pin hole is positioned on the semi-circular end portion of the flange, on a centreline of the filling shoe, wherein the centreline runs through the centre of the slurry opening and is parallel with the two lateral sides.

10. The filling shoe according to claim 1, wherein the at least one annular sealing member has a section of decrease elevation with respect to the axial direction of the slurry opening, wherein said section is arranged to accommodate a pin head of a pin, said section being at the elevation of the flange on either side of the at least one annular sealing member, wherein the pin hole is positioned within said section.

11. The filling shoe according to claim 1, wherein a plurality of annular sealing members are provided on the flange.

12. The filling shoe according to claim 1, wherein the at least one annular sealing member is a rib profile formed on the flange.

13. The filling shoe according to claim 1, wherein the outer edge of the body has a bevel inwardly towards the filter chamber side at the straight end.

14. The filling shoe according to claim 1, wherein an area of reduced thickness extending between the two lateral sides is provided at the straight end.

15. The filling shoe according to claim 1, wherein at least one longitudinal groove extending from the slurry opening towards the straight end is provided on the filter chamber side for forming a slurry passage between the slurry opening and a filter chamber.

16. The filling shoe according to claim 15, wherein multiple longitudinal grooves extending from the slurry opening towards the straight end are provided on the filter chamber side for forming separate slurry passages between the slurry opening and a filter chamber, wherein adjacent grooves are separated by ridges, each ridge being preferably provided with a longitudinal sealing rib.

17. A filling shoe arrangement comprising:

at least one filling shoe according to claim 1, wherein;

a filter medium for a horizontal filter press, wherein said filter medium comprises at least one first opening functionally arranged to cooperate with the annular groove of the filling shoe, and at least one second opening arranged to cooperate with the pin hole of the filling shoe, such that the dimensions and position of the first and second opening functionally correspond to those of the annular groove and the pin hole of the filling shoe, further comprising:

a pin having an outer dimension functionally corresponding to the inner dimension of the pin hole and the second opening of the filter medium, the pin being equipped with a pin head having an outer dimension larger than the inner dimension of the pin hole, the first opening of the filter medium is positioned around the slurry opening, in the annular groove of the filling shoe, between the flange and the rest of the filter plate side of the body, thereby attaching the filling shoe to the filter medium, the second opening of the filter medium being aligned with the pin hole, and the pin being inserted into the pin hole and through the second opening of the filter medium, such that the pin head abuts the flange, thereby locking the rotational position of the filling shoe with respect to the filter medium.

18. A filter medium assembly comprising:

first and second filling shoe arrangements according to claim 17, wherein filter chamber sides of the filling shoes of the first and second filling shoe arrangements are positioned so as to oppose each other in an aligned manner, such that the position of the slurry opening on the filling shoe of the first filling shoe arrangements corresponds to that of the second filling shoe arrangement, thus enabling a filter chamber to be formed between the filter media of the first and second shoe arrangements by pressing the filter medium assembly between adjacent filter plates.

19. The filter medium assembly, according to claim 18, wherein a slurry passage extending from the slurry opening is formed between the first and second filling shoe arrangements, the slurry passage being defined by the at least one longitudinal groove of the first filling shoe pressed against the flat surface of filter chamber side body of the second filling shoe.

20. A method for providing a filter medium with a filling shoe in a horizontal filter press, comprising the steps of:

providing a filling shoe according to claim 1;

providing a filter medium comprising at least one first opening corresponding to the annular groove of the filling shoe, and at least one second opening corresponding to the pin hole of the filling shoe, such that the dimensions and position of the first and second opening corresponds to those of the annular groove and the pin hole of the filling shoe, further comprising:

providing a pin;

positioning the filter medium around the first opening in the annular groove of the filling shoe, between the flange and the rest of the filter plate side of the body;

positioning the filling shoe rotationally with respect to the filter medium such that the second opening of the filter medium is aligned with the pinhole, and inserting the pin into the pin hole and through the second opening of the filter medium, wherein the pin is inserted from the filter plate side of the filling shoe.

\* \* \* \* \*